Feb. 2, 1943. J. R. GARDNER 2,309,839
FLOAT COLLAR
Filed Aug. 31, 1940
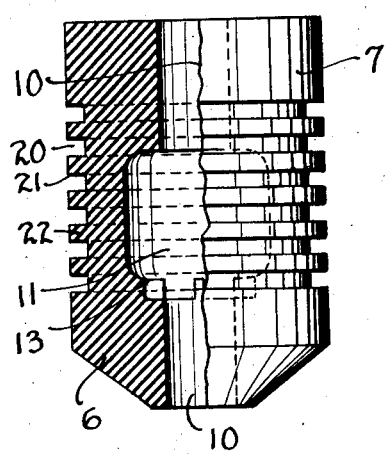
Fig. 1.
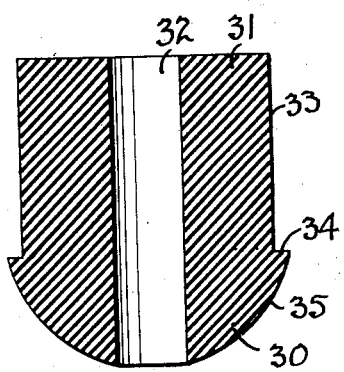
Fig. 3.
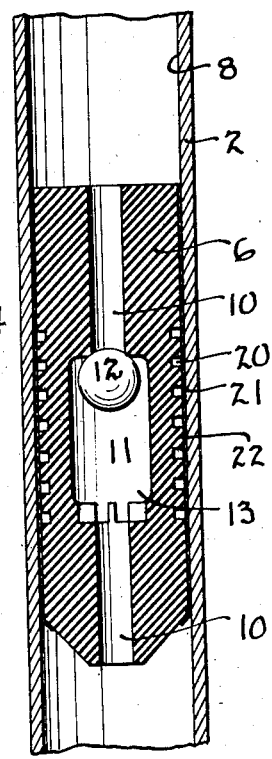
Fig. 6.
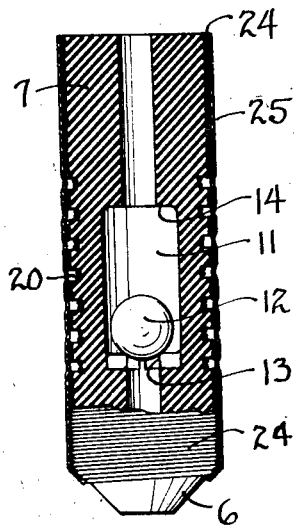
Fig. 2.
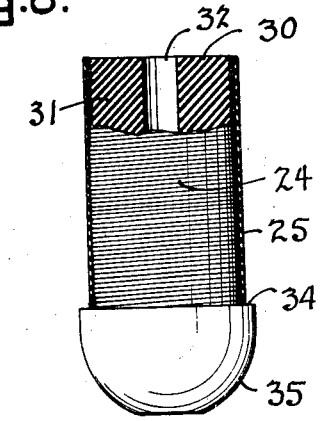
Fig. 4.
Fig. 5.
Inventor
J. R. GARDNER
Lester B. Clark
Attorney Patented Feb. 2, 1943

2,309,839

UNITED STATES PATENT OFFICE 2,309,839

FLOAT COLLAR

John R. Gardner, Houston, Tex.

Application August 31, 1940, Serial No. 354,969

3 Claims. (Cl. 166—1)

The invention relates to floating equipment to be utilized in lowering strings of pipe into a well bore.

When a string of pipe is to be lowered into a well bore which is filled with drilling mud, the practice is to take advantage of the floating effect of the hollow pipe in order to assist in supporting a portion of the weight of the pipe as it is being lowered. With this in mind the lower end of the pipe is usually closed by a valve structure of some sort and the practice has been to connect a collar which is threaded or welded to the outside of the pipe. These collars may contain a closure of various materials such as "Bakelite," cement, cast iron, brass or other drillable material which can be drilled out when the drilling of the well is to be continued after the pipe has been landed.

The construction and connection of this float collar is expensive and unnecessary in view of the present invention, wherein a rubber body is to be deformed and inserted into the pipe without performing any operations on the pipe such as threading, welding, etc. After the rubber body is inserted in position, it will be arranged to permit its expansion so that the inherent resiliency of the rubber will cause it to grip inside of the pipe and hold the pipe in position.

It is another object of the invention to provide a rubber float collar.

It is another object of the invention to provide a rubber float shoe.

It is still another object of the invention to provide a rubber float collar and a rubber float shoe which comprise a body of resilient material such as rubber, which bodies are normally of a diameter substantially in excess of the inside diameter of the string of pipe to which they are to be applied so that the bodies may be compressed, inserted in the pipe, and permitted to expand so that the inherent resiliency thereof will create a frictional grip with the inside surface of the pipe to retain the bodies in position.

Another object of the invention is to provide a rubber float collar or guide shoe which can be temporarily deformed and retained in such deformed position so that it may be inserted in a pipe to thereafter expand and grip the pipe.

Still another object of the invention is to provide a rubber float collar which can be deformed and temporarily retained in such deformed position by a restraining means, which means in turn can be thereafter released by corrosion or otherwise, so as to release the body.

Another object of the invention is to provide a float collar which may be fitted into a string of pipe where the pipe requires no special construction in order to receive and hold the float collar.

It is still another object of the invention to confine a rubber float collar by means of a wire or metal sleeve which is subject to corrosion so as to release the rubber.

Other and further objects of the invention will be readily apparent when the following description is considered in connection with the accompanying drawing, wherein:

Fig. 1 is a side elevation of a rubber float collar with certain parts in section to illustrate the construction thereof.

Fig. 2 is a vertical sectional view of the same float collar deformed and confined for insertion in the string of pipe.

Fig. 3 is a vertical sectional view of a rubber guide shoe.

Fig. 4 is a side elevation of the guide shoe of Fig. 3 deformed by a wire wrapping and enclosed in a protective sleeve.

Fig. 5 shows a vertical sectional view of a string of pipe to which the rubber float collar and rubber guide shoe have been attached.

Fig. 6 shows a modified form of the check valve used in a float collar.

In Fig. 5 a string of pipe 2 has been illustrated which is to be lowered into a well bore and it is desirable to close the lower end of this string of pipe. The prior practice has been to thread the lower outer periphery of the pipe as at 3 and to connect thereto a threaded coupling carrying a float collar. The outer surface of the pipe had to be threaded to receive this collar in addition to the cost of construction of the collar. In other instances, the collar has been welded directly to the lower end of the pipe but this required the use of welding equipment at the well when the pipe was to be floated into position.

In some instances also the float collar would be placed between the last and next to last sections of pipe by a threaded connection and a guide shoe then threaded or welded to the lower pipe section. In each instance, therefore, it is apparent that special construction and operations were required which were costly and time consuming. With the present invention the pipe 2 need not be threaded or otherwise prepared to receive the float collar and guide shoe and as seen in Fig. 5 the pipe is of smooth construction and has a plain lower end 4 thereon.

Fig. 1 shows a float collar 6 which is in the form of a body 7 of molded rubber or other suitable resilient material. It should be particularly noted that the diameter of this body 7 is substantially greater than the inside diameter 8 of the string of pipe 2. The body 7 is molded in this manner so that it can be deformed to a lesser diameter approximating that shown in Fig. 2 as compared with the diameter shown in Fig. 1. The sizes are, of course, merely relative because different diameter pipes are lowered into the well bore. The idea being expressed, however, is that the body 7 will have to be deformed and substantially contracted in order to reduce it to a diameter so that it can be inserted in the pipe.

As seen in Fig. 1 the body 7 has a passage 10 therethru so that a circulation of liquid may be accomplished. Intermediate the ends of the passage 10 is a valve chamber 11 which is arranged to receive ball valve 12 as seen in Fig. 2. This valve rests on the wings 13 so that there may be a circulation of liquid downwardly thru the float collar and around the valve 12. The upper end 14 of the chamber, however, is in the form of a seating area against which the ball will engage, as seen in Fig. 5, to prevent the upward flow of fluid thru the float collar. If desired the type of valve 15 shown in Fig. 6 may be used wherein a stem 16 is provided on the valve to hold it properly centered and the long tapered surface 17 will create a wedging effect with the upper end of the passage 10 so that the greater the pressure, the greater will be the tendency to provide a seal.

The periphery of the collar 6 may be formed with annular grooves 20 so as to create a gripping action by the corners 21 of the ribs 22 between the grooves against the inside of the pipe 2.

The body 7 of rubber may be confined in any desired manner so that it will be deformed to a size such that it is insertable into the pipe 2 as seen in Fig. 5. A tremendous hydraulic pressure might be used to accomplish the deformation of the rubber but another method has been shown in Fig. 2, wherein the periphery of the body 7 has been enclosed by a wrapping of wire 24. The wrapping of wire serves to deform the body of material and reduce its diameter. The diameter of the passage 10 and the chamber 14 were designed so that the reduction caused when the body is deformed would still permit the passage of the desired amount of fluid and the operation of the check valve 12.

If desired the wrapping 24 of the wire may be enclosed in a thin sleeve or sheath of rubber or other suitable material 25.

It is intended that the wire wrapping 24 will confine the body so that it can be inserted in the pipe 2 and then the wire released so as to allow the rubber body to expand and grip the periphery 8 on the inside of the pipe. The inherent resiliency in the rubber or other material will thereby hold the float collar firmly in its set position.

Various procedures may be adapted for releasing the wire wrapping 24, one of which would be to apply a corrosive acid or other material to the wire just before its insertion in the pipe so that when corrosion occurred, the wire would release the rubber for expansion. In lieu of the wrappings of wire, a thin metal sleeve might be used but it is intended that the invention broadly contemplates any sort of a confining means for the rubber body or the rubber body may be confined by hydraulic pressure and inserted in the pipe by tremendous pressure if desired.

Figs. 3 and 4 show a guide shoe 30 which is formed to a body 31 of rubber having a passage 32 therein. The periphery 33 is reduced slightly to form a shoulder 34 which merges the body with the guiding surface 35, forming the lower portion of the guide shoe. This guide shoe will be deformed as seen in Fig. 4 in any one of the manners described for the float collar. It will then be inserted in the lower end of the pipe 2 as seen in Fig. 5 so that the inherent resiliency of the material will hold the guide shoe in place.

Broadly the invention contemplates an assembly of guiding and floating equipment made of a resilient material which will be held in position by the inherent resiliency of such material.

What is claimed is:

1. A float collar for well pipe comprising a unitary body of rubber normally of greater diameter than the inside of the pipe which is to carry said collar, means to confine said body to a diameter such that it is insertable in the pipe, said means being releasable after insertion so that the inherent resiliency of the rubber will effect a frictional grip on the inside of the pipe to retain the body therein, said releasable means being corrodible.

2. A rubber float collar, a plurality of annular grooves in the periphery thereof, and a passage through said collar.

3. A method of inserting rubber float collars in a pipe to be floated which comprises confining a body of resilient material so that it has a diameter less than that of the pipe, inserting the confined material in the pipe, and releasing the confined body by corrosive action so that the inherent resiliency thereof will effect a frictional grip on the inside of the pipe to retain the body in position in the pipe.

JOHN R. GARDNER.